(12) United States Patent
Fonseca et al.

(10) Patent No.: US 9,819,681 B1
(45) Date of Patent: *Nov. 14, 2017

(54) DATACENTROID

(76) Inventors: Danilo E. Fonseca, Shiloh, IL (US);
Manny A. Fonseca, Sacramento, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/488,243

(22) Filed: Jun. 4, 2012

Related U.S. Application Data

(63) Continuation of application No. 11/496,389, filed on Jul. 31, 2006, now Pat. No. 8,195,625.

(60) Provisional application No. 60/704,330, filed on Aug. 1, 2005.

(51) Int. Cl.
*G06F 21/00* (2013.01)
*H04L 29/06* (2006.01)
*G06F 1/26* (2006.01)
*G06F 21/86* (2013.01)

(52) U.S. Cl.
CPC .............. *H04L 63/10* (2013.01); *G06F 1/26* (2013.01); *G06F 21/86* (2013.01); *H04L 2463/102* (2013.01)

(58) Field of Classification Search
CPC ....................................................... G06F 21/86
USPC ............................................................. 726/26
See application file for complete search history.

(56) References Cited

U.S. PATENT DOCUMENTS

| | | | |
|---|---|---|---|
| 2002/0040439 A1* | 4/2002 | Kellum | G06F 21/567 726/26 |
| 2003/0131115 A1* | 7/2003 | Mi | G06F 21/6218 709/229 |
| 2003/0172167 A1* | 9/2003 | Judge | H04L 51/12 709/229 |

* cited by examiner

*Primary Examiner* — Longbit Chai
(74) *Attorney, Agent, or Firm* — Jason P. Webb; Pearson Butler

(57) ABSTRACT

A modular, expandable, and flexible computer system device is provided. The computer system device comprising a multiple number of individual modules interconnected physically via 'back plane' means with each module independently processing and executing specified computer functions utilizing internal or shared resources. Electrical power distribution and data communications are positioned between modules with the electrical power distribution and data communications internal to the base unit module.

6 Claims, 12 Drawing Sheets

EMP-5 E-commerce Functionality

*Note1: Extreme exposure and access of personal data to business community.*

- EMP-5 represents you and no one else. No one controls it except you.
- Set EMP-5 to automatically make online payments (Insurance, mortgage, etc...)
- Control to stop any payment any time
- Add or Remove vendors (anytime)
- Monitor and make available in real time bank activity.
- Separate normal Credit Card when buying online (secure)
  - Virtual Credit card- a unique online credit card that will only be used when buying Online (reside internally).
    - Option: capability for the user to select and input his own Credit Card #.
- Secure Online Buying
  - Option1: when request to buy item, EMP-5 will fill in all necessary blanks with preselected data then complete transaction.
  - Option2: DataDominion buys item for you.

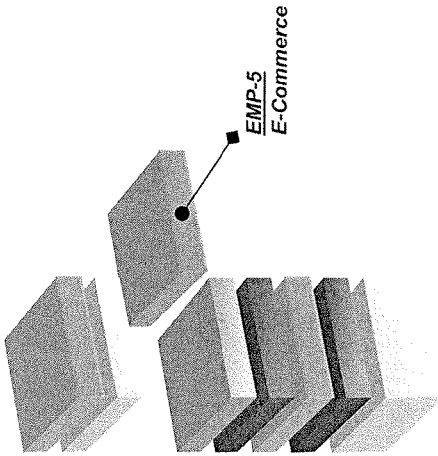

EMP-5
E-Commerce

Figure 2

*Note2: Remove businesses from accessing and controlling Your money. Mistakes done in seconds...Fixes (guilty or not) Takes months to correct.*

All information within this document is property of DataDominion Technologies, Inc. All Rights reserved. You may not utilize, share, reproduce, or modify this document in whole or in part without permission in writing from DataDominion Technologies, Inc.

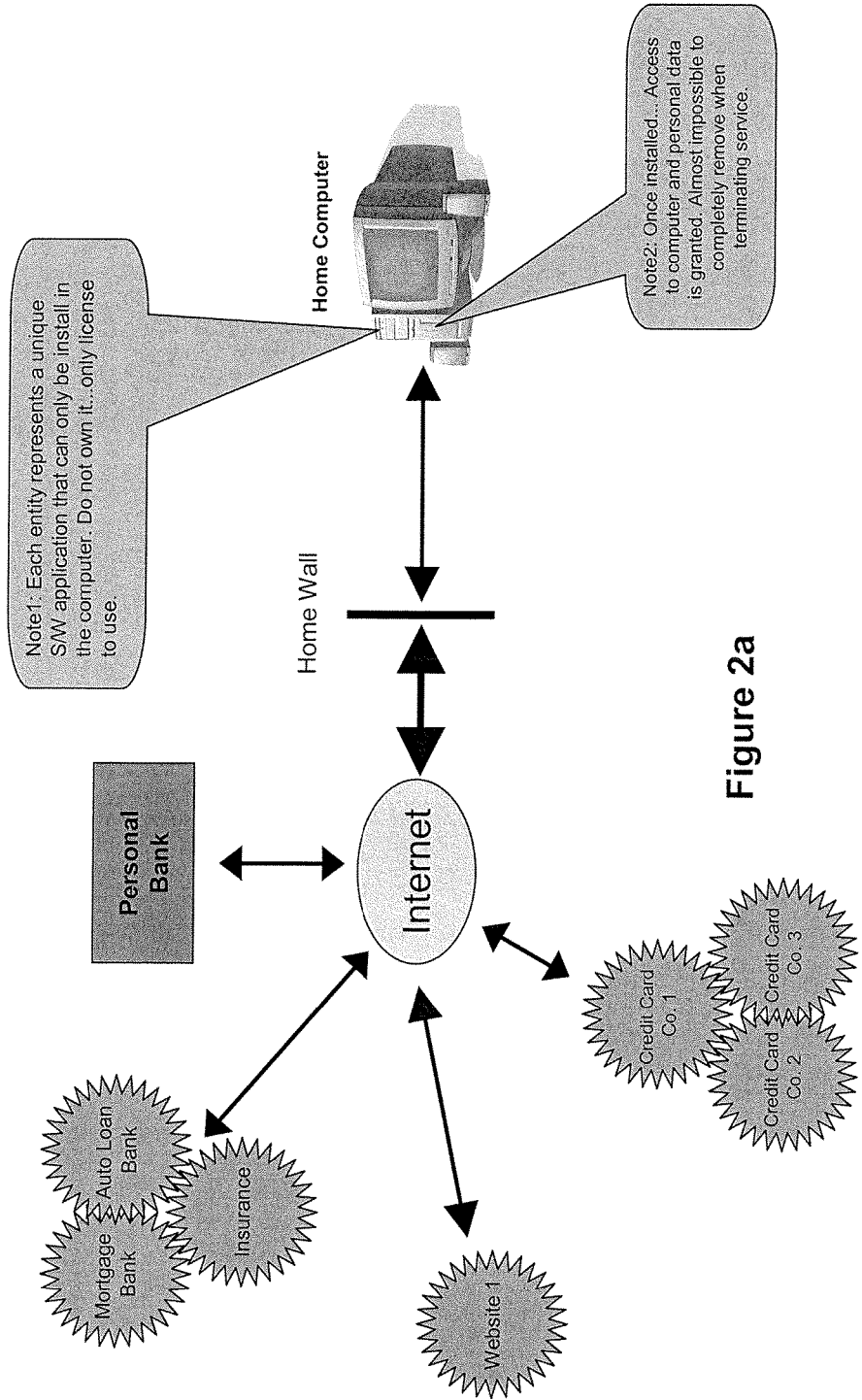

EMP-6 Parental controls

*Note: 24/7
Computer babysitter*

- Monitor and control all Internet activities
- Prevent children from changing or by-passing parent settings.
- Archive and make information available on demand (history, websites, emails, instant message communications, etc..
- In addition to searching for key words to avoid, set EMP-6 to ONLY allow websites that the parent chooses thus maximizing protection. Parents can either select from provided selection or in real time.

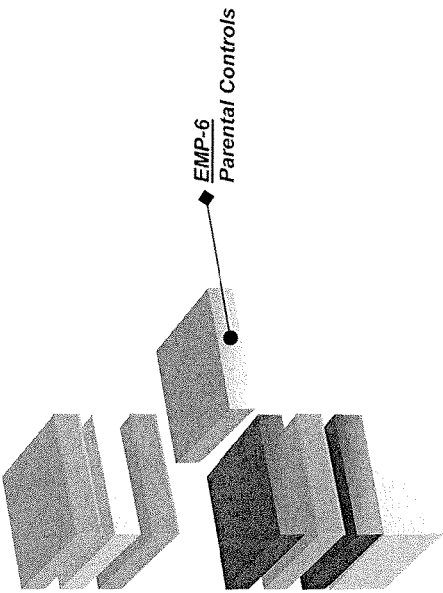

*EMP-6
Parental Controls*

Figure 3

EMP-8 Internet Phone

- Unlimited calls anywhere in the US or Canada.
- Easy to use display
- Local, regional and long distance service
- Check voicemail via phone, e-mail or online
- Caller ID
- Call Waiting
- Call Forwarding
- 3-Way Calling
- In-Network Calling Call Transfer
- Call Return, Repeat Dialing
- Click-2-Call
- 911

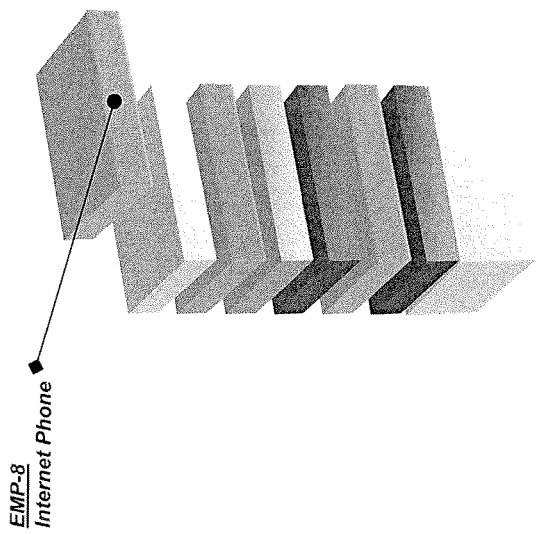

EMP-8
Internet Phone

Figure 4

All information within this document is property of DataDominion Technologies, Inc. All Rights reserved. You may not utilize, share, reproduce, or modify this document in whole or in part without permission in writing from DataDominion Technologies, Inc.

EMP-9 Wireless Data Manager

- Ability to Encrypt and distribute all types of data.
- Data Security Controls
- Communicate with other smart devises.

EMP-9
Wireless Data Manager

DATACENTROID

REFERENCE TO RELATED APPLICATIONS

This application is a continuation of my application having Ser. No. 11/496,389, filed Jul. 31, 2006, now U.S. Pat. No. 8,195,625, issued Jun. 5, 2012, and which is incorporated herein in its entirety by reference, and which also claims the benefit of priority of my provisional patent application Ser. No. 60/704,330, filed on Aug. 1, 2005, entitled "Data Centroid".

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1 Field of the Invention

This invention relates generally to a method of redesigning and 're-packaging' current personal computers. The design concept addresses the need to provide better computer security, flexible capabilities to adapt to new technologies and change the "all-in-one" philosophy of integrating/installing all Software applications into 'One box'.

2 Description of the Prior Art

The introduction of the digital computer revolutionized methods of computing, processing data, and controlling other devices and systems. A computer is a general purpose (Hardware/Software) tool built around a microprocessor. It is defined as a small, single-user computer based on a microprocessor, a keyboard, a monitor, and a memory storage device for saving and retrieving data.

Since the introduction of the personal computer (PC), consumers have accepted and embraced the personal computer as an integral part of society. To meet consumer demand, personal computers have evolved by expanding its capabilities and options. Incorporating new technologies such as the Internet, allowing a user to be connected to the world; communicating and exchanging information at a click of a button. To meet consumer demand and controlling cost, companies have adopted the 'all in one' philosophy and have focused their efforts internally to the computer. An 'all in one' philosophy is where all improvements and all software products (current, new future) are internally installed into one computer, thus creating a single point of failure' possibility.

Due to antiquated computer design, growing competition, software complexity and security concerns, computers require a change in philosophy and a new method of controlling and processing information.

Therefore, it is the objective of the present invention to address current and future computer flaws by providing alternative solutions to current Computer design. Solutions consists of a change in the 'all in one' philosophy, providing a new more modular design, maximizing computer data control/security, and providing a flexible design to adapt and meet new technologies.

SUMMARY

The above objectives are met by re-designing current integrated computer architecture and adapting to a new modular means of housing and processing data. The Data-Centroid modular concept simplifies, separates or groups specific software products or functions (software applications) into supporting individual hardware units that easily installs to one another. An example of a modular function will be Email capabilities (FIG. 1, Dc-2). At the user level, the modular concept does not change how the user interacts with the computer but the user can visually see the physical changes in computer appearance. Advantages of the modular design to consumers include greater capability to control and protect personal data/property, the power to grant/deny access to a selected vendor, greater capability to completely monitor, control, or remove a vendor when services are no longer needed without hassle, inexpensive means to upgrade, adapt, and expand to new technologies and innovative products. Additionally, home computers are no longer the only devices capable of storing, sharing, or communicating via the Internet so utilizing and incorporating patented technology (U.S. Pat. No. 6,660,950), the consumer will have greater security and control of such devices (wireless, smart appliances, smart homes).

Dc-1 (Operating system S/W, Monitoring System, Access Control, Data Processing, Maintenance Manager, Data/Equipment protection manager (firewall), Internet Radio, Web Browser, Modem, and Data Line switch, The data line switch is patented under U.S. Pat. No. 6,660,950, owned by the inventor of the present application, and herein hereby incorporated by reference.

Dc-2 (Audio and Video E-Mail, Pop-Up Manager, Cookie Manager, Anti-virus, Messenger Manage).

Dc-3 (Multi Purpose Seamier/reader for current and future data formats and types (mediums).

Dc-4 (Anonymous Manager, Encryption Manager).

Dc-5 (E-Commerce).

Dc-6 (Parental Controls).

Dc-7 (Independent/Expandable data Warehouse, Extra Memory).

Dc-8 (Internet Phone & Video conferencing).

Dc-9 (Wireless Data Manager).

Figure 1:
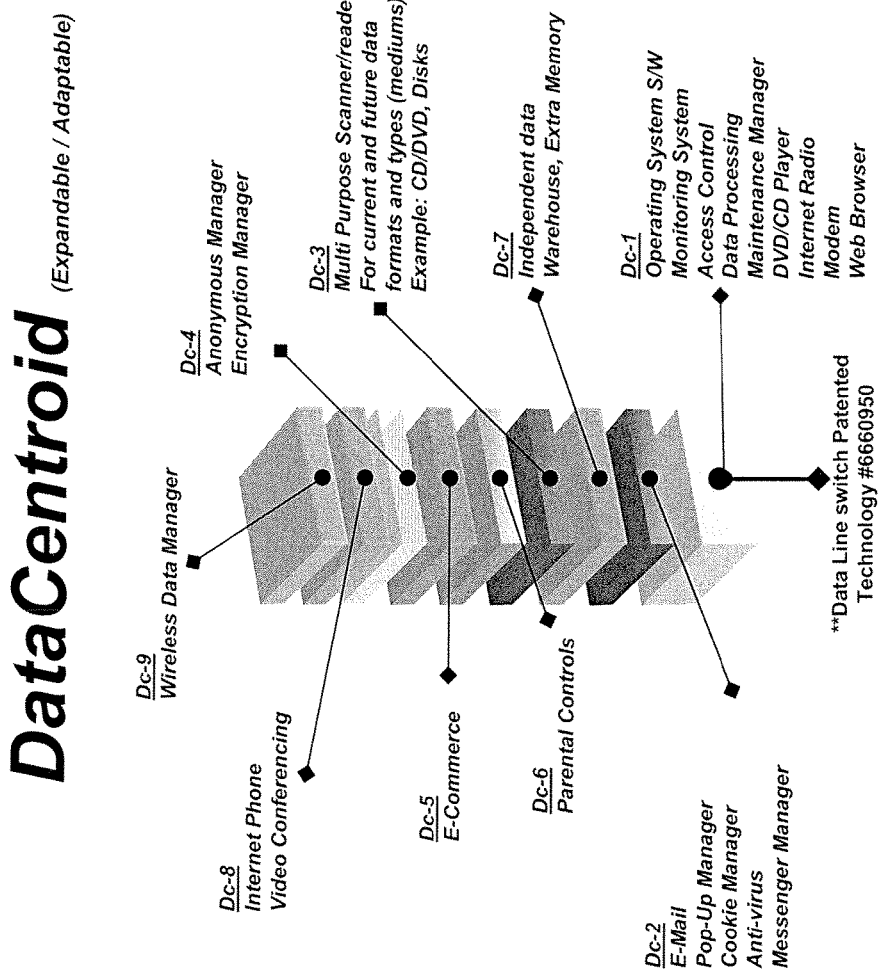
FIG. 1 illustrates the present Invention with associated individual Dc modules and functions.
Figure 1A:
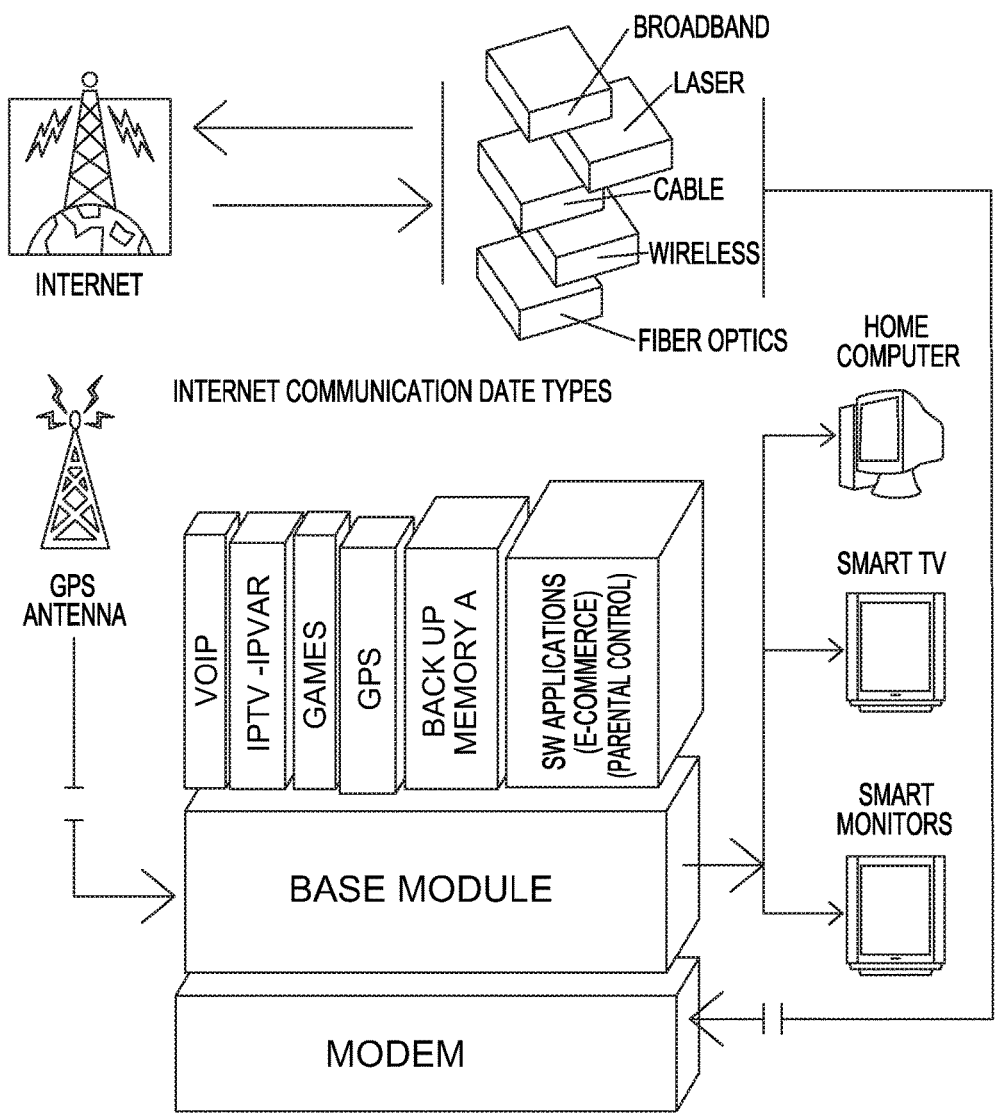
Figure 1B:
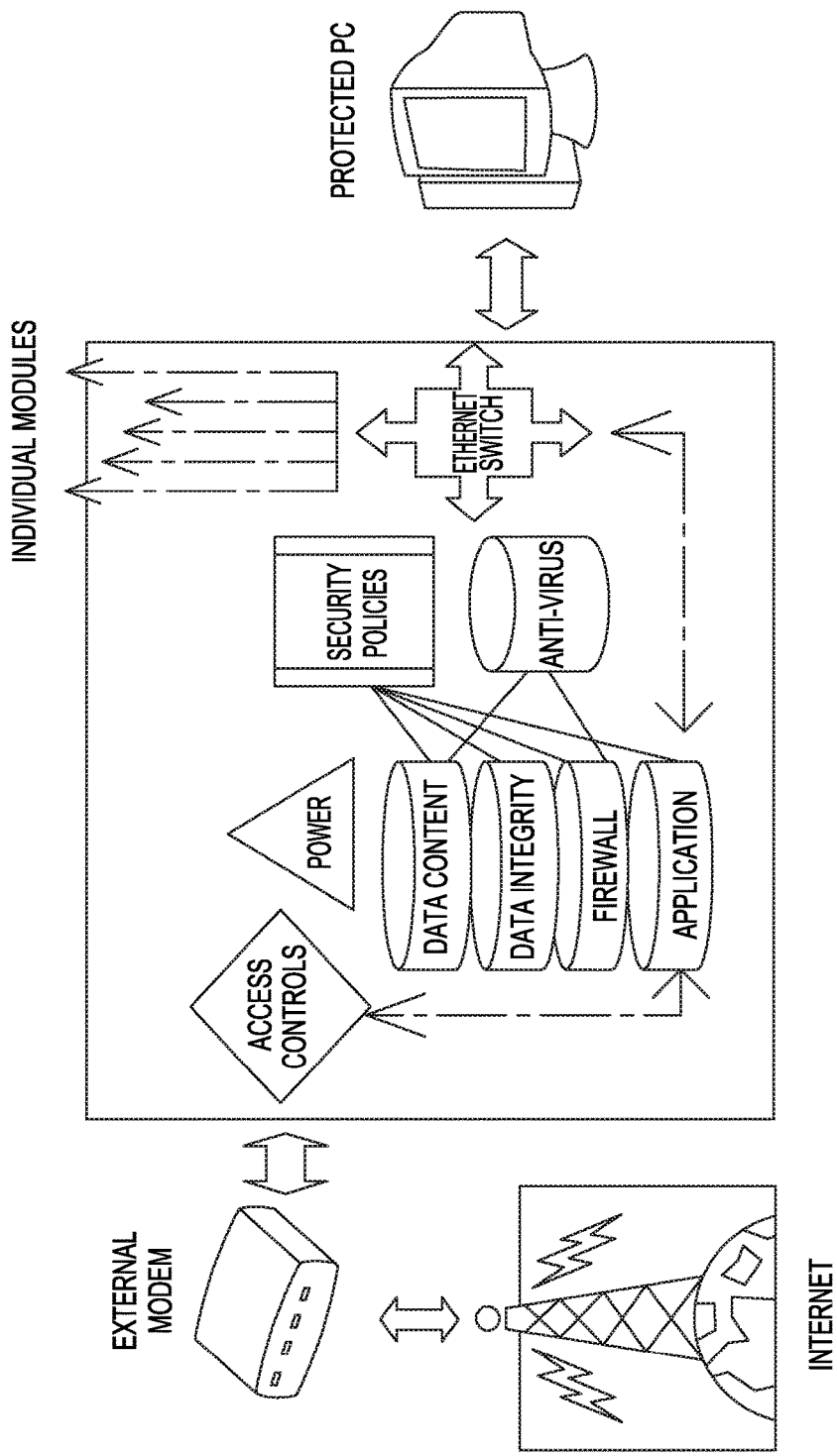

FIG. 1*a* illustrates one embodiment of the base unit components (Dc-1).

FIG. 1 *b* illustrates the multi layer data inspection and processing.

FIG. 2 illustrates one embodiment with a direct application to E-commerce.

Figure 2B:
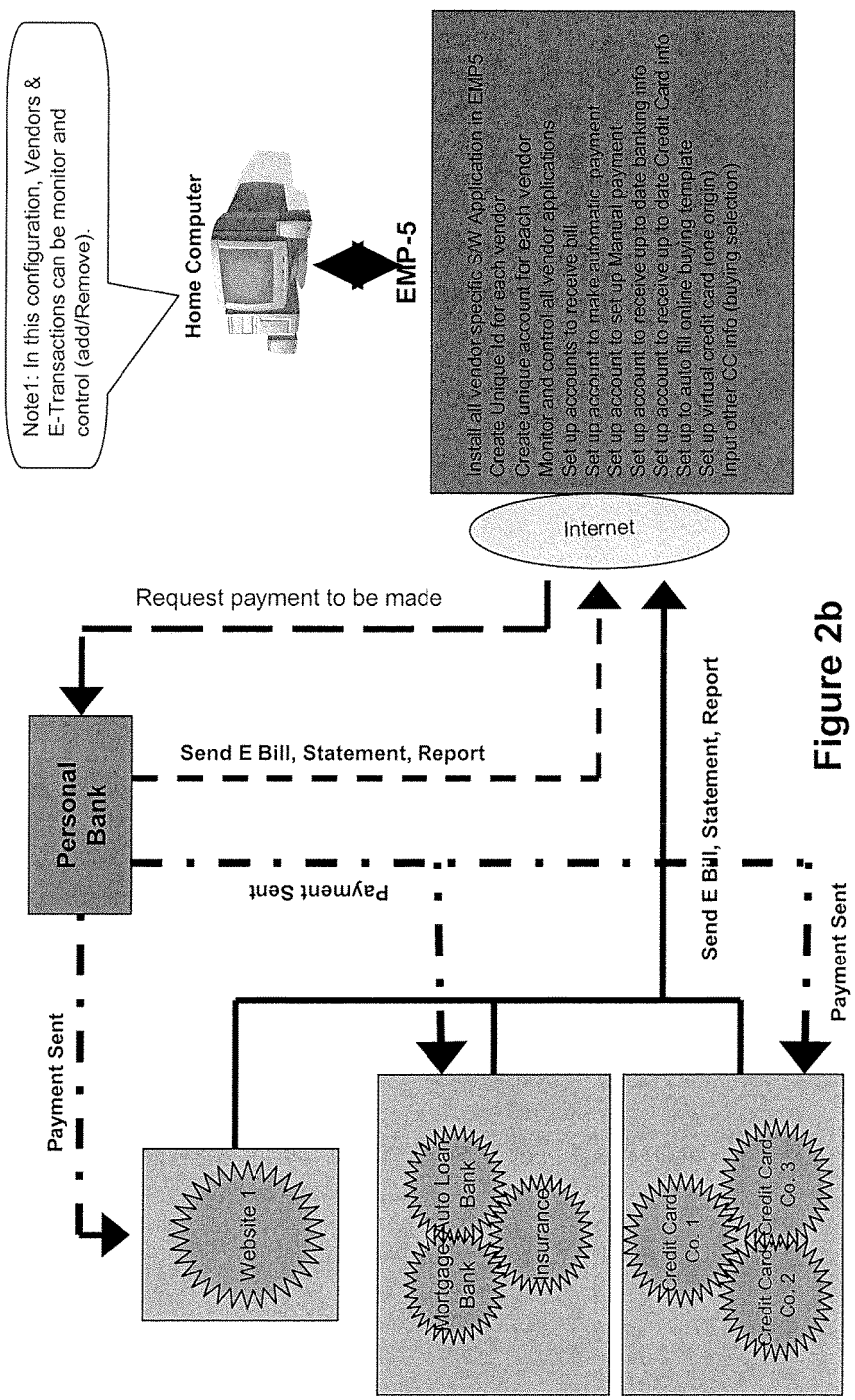

FIG. 2*a* illustrates one embodiment with a direct application to E-commerce. FIG. 2*b* illustrates one embodiment with a direct application to E-commerce.

FIG. 3 illustrates one embodiment with a direct application to Internet Parental controls.

Figure 3A:
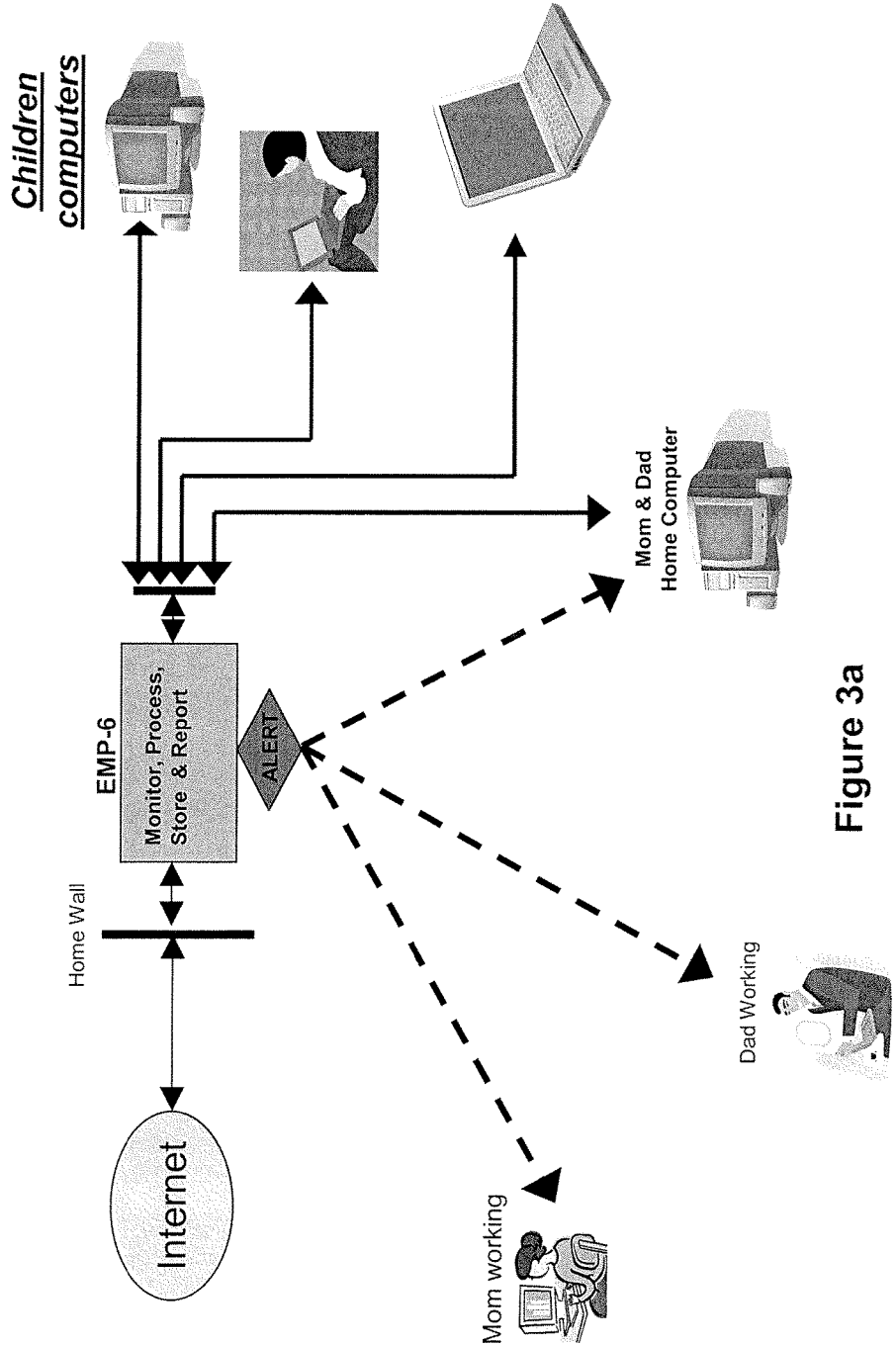

FIG. 3*a* illustrates one embodiment with a direct application to Internet Parental controls.

FIG. 4 illustrates one embodiment with a direct application to Internet phone and video conferencing functions.

Figure 5:
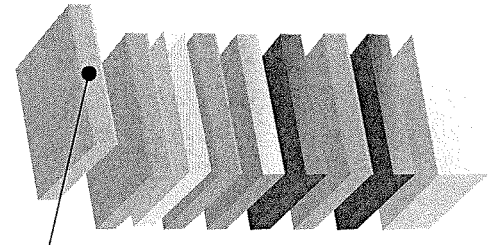

FIG. 5 illustrates one embodiment with a direct application to Internet wireless data manager.

Figure 5A:
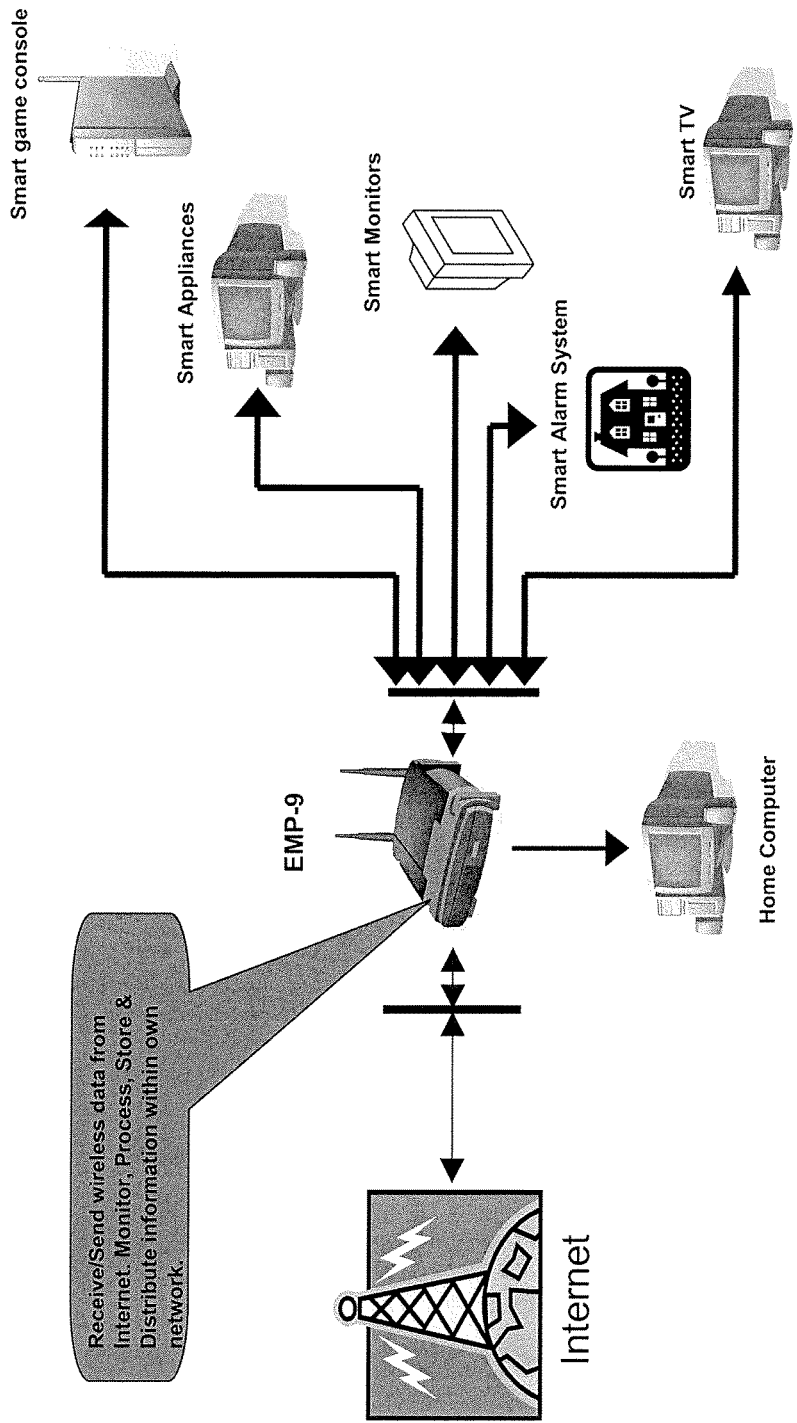

FIG. 5*a* illustrates one embodiment with a direct application to Internet wireless data manager.

Figure 6:
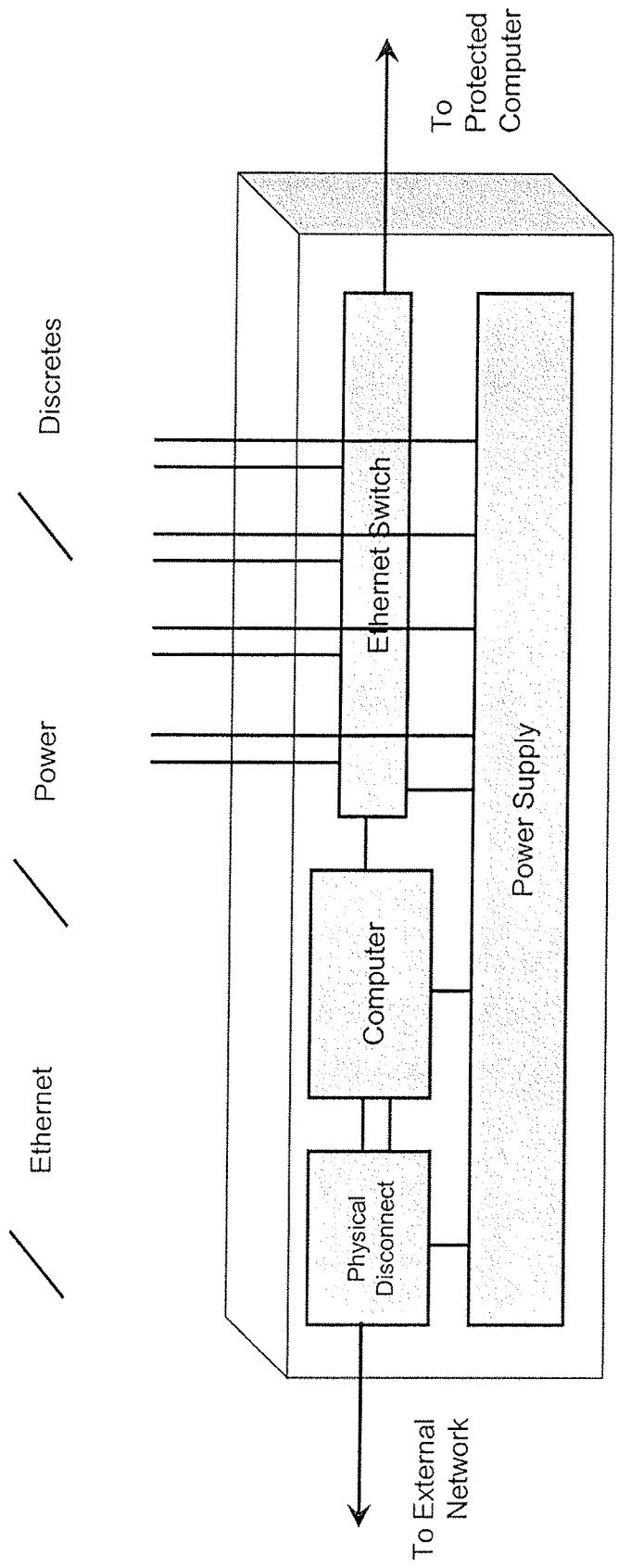

FIG. 6 illustrates the ethernet switch.

DETAILED DESCRIPTION OF THE PREFERRED EMBODIMENTS

While the present invention is susceptible of embodiment in many different forms, drawings will be shown and herein described with the understanding that the present disclosure is to be considered as an exemplification of the principles of the invention and is not intended to limit the invention to the embodiments illustrated.

FIG. 1 illustrates the present invention and its comprised design and components. According to the illustration, the modular concept separates or groups specific software products or functions (software applications) into supporting individual hardware units that easily installs on top of one another. A Master/slave design, the Dc-I will house all necessary supporting hardware and software applications to store, update, and perform all necessary functions to control, monitor, processes, and manage all incoming and outgoing data.

FIG. 1a illustrates the base unit design and comprised components. According to the illustration, the hardware components comprise, at a minimum, a computer, a power supply unit, power distribution mechanism means (Ex. Backplane), Ethernet switch (data routing), 2 connection mechanism for electrical power and data communications between base unit and modules.

FIG. 2 illustrates the present invention and its comprised design and components for E-commerce applications. As an individual hardware unit, the DC-5 will house all necessary supporting software applications to store, update, and perform all necessary E-commerce functions. As an individual hardware unit, the DC-5 will have the capability to perform all assigned E-commerce functions, such as but not limiting to the following:
  Represents user, no one controls it except you.
  Automatically make online payments without logging in or utilizing a web site.
  Allow manual online payments without logging in or utilizing a web site.
  Control Online transactions, stop any payment any time.
  Add or Remove vendors (anytime).
  Monitor and make available in real time bank activity information.
  Store and make available normal Credit Card when buying online (secure).
  House and make available Virtual Credit card—a unique online credit card, with
    one origin, that will only be used when buying On-line (reside internally).
  Make available the capability for the user to select and input regular Credit Card number.
  Secure Online Buying (Encryption).
  Make available the capability to fill in all necessary online buying blanks with pre selected data then complete transaction.
  Interface with user-friendly display and controls.
  Install, store, and maintain all vendor specific S/W Application in DC5. Create Unique ID for each vendor.
  Create unique account for each vendor.
  Monitor and control all vendor applications.
  Configure to receive assigned vendor bill.
  Set up account to receive up to date Credit Card info.

FIG. 2a illustrates the present Online Billing and Paying Set-Up.

FIG. 2b illustrates the present invention and it's comprised functional design for E-commerce applications.

FIG. 3 illustrates the present invention and it's comprised design and components for Parental control applications. As an individual hardware unit, the DC-6 will house all necessary supporting software applications to store, update, and perform all necessary Parental control functions. As an individual hardware unit, the DC-6 will have the capability to perform all assigned parental control functions, such as but not limiting to the following:
  Monitor and control all Internet activities.
  Prevent children from changing or by-passing parent settings.
  Archive and make information available on demand (history, websites, emails, instant message communications, etc.
  Immediate alert notification to assigned destination(s).
  In addition to searching for key words to avoid, set DC-6 to ONLY allow websites that the parent chooses thus maximizing protection. Parents can either select from provided selection or in real time.
  Interface with user friendly display and control.

FIG. 3a illustrates the present invention and it's comprised functional design for parental control functions.

FIG. 4 illustrates the present invention and its comprised design and components for Internet phone and video conferencing applications. As an individual hardware unit, the DC-8 will house all necessary supporting software applications to store, update, and perform all necessary Internet phone and video conferencing functions. As an individual hardware unit, the DC-8 will have tile capability to perform all assigned Internet phone functions, such as but not limiting to the following:
  Interface with user friendly display and controls.
  Local, regional and long distance service.
  Check voicemail via phone, e-mail or online.
  Caller ID.
  Call Waiting.
  Call Forwarding.
  3-Way Calling.
  In-Network Calling Call Transfer.
  Call Return, Repeat Dialing.
  Click-2-Call.
  911 capabilities.

FIG. 5 illustrates the present invention and its comprised design and components for Wireless data manager applications. As an individual hardware unit, the DC-9 will house all necessary supporting software applications to store, update, and perform all necessary Wireless data manager functions. As an individual hardware unit, the DC-9 will have the capability to perform all assigned Wireless data manager functions, such as but not limiting to the following:
  Ability to Encrypt and distribute all types of data communications such as video, audio and data.
  Data Security Controls.
  Communicate with other smart devices.
  Control other smart devices.
  Monitor and control all incoming/outgoing wireless data.
  Interface with user friendly display and controls.
  Support IEEE standards.
  Support Ethernet—10 Mbps Twisted Pair (10BaseT).
  Support Ethernet—100 Mbps Two-Pair (100BaseTX).
  Support Wireless Ethernet—11 Mbps IEEE802.11b.
  Support Wireless Ethernet—54 Mbps IEEE802.11a.

FIG. 5a illustrates the present invention and it's comprised functional design for Wireless data manager functions.

RELATED APPLICATION

The conceptual design for the above mentioned Invention is a conceptual design but has enormous potential to expand and adapt to current and future Internet technologies and innovative hardware/software related products.

1. The present invention is not limited to any existing operating system or versions. The present invention will perform all tasks on current software operating system platforms such as Windows or UNIX platforms.
2. The present invention is not limited to the PC market. The present invention can easily be applied without major updates nor costs to the Internet, automobile, television and cable, entertainment, financial and housing markets.
3. The present invention can be applied and function as a primary replacement of current PC's or can be applied as a secondary functional device. Installed in series with another PC for maximum data/equipment protection, all incoming data types will be process by the invention first before being released to the protected computer. All outgoing data types will be process by the invention before allowing release of data type to outside networks.

The foregoing exemplar descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements that are disclosed herein.

What is claimed is:

1. A self-contained, stand-alone, modular, expandable, and flexible data access device that controls data delivery to a computer system being protected and controls data transmittal through the device and to and from the computer system comprises:

a plurality of individual processing modules, each processing module being configured for independently processing and executing specified computer security functions utilizing internal or shared resources;

a base module that is separately connected in series with the protected computer system such that incoming data is processed first before being released to the protected computer system and includes an operating system for controlling the security functions and cooperation of the plurality of individual processing modules with the base module and includes power and data connectors on said base module to which said processing modules are mated to provide physical support and data connectivity for each of the plurality of individual processing modules that is programmed to execute specific data analysis functions relating to access to external computer networks, so that the processing modules are directly attached to the base module, the base module being removably, electronically connected to and physically supported from a modem module that provides exclusive connectivity incoming and outgoing data that passes exclusively through the base module, such that the processing modules are physically supported on the base module, is controlled by software supported entirely on the base module and the modem is also plugged directly into the base module, allowing utilization of internal or shared resources amongst the base module and the processing modules;

electrical power module connected to said processing modules, the electrical power connection being provided through the base module; and a data line switch for providing electronic data communication between said processing modules and said base module, wherein said means for electronic data communication comprises a connector mechanism that is housed in said base module and allows the plurality of individual processing modules to be plugged directly into the base module, supporting the plurality of individual processing modules against the base module and leaving the plurality of individual processing modules visible and accessible by projecting from the base module;

where said computer system access device will house a power supply and a data processor with an operating system and software applications to store, update, and perform all necessary functions to control, monitor, processes, and manage all incoming and outgoing data and programmed to function as a stand-alone multi-functional primary source of electronic data management and electronic data processing for all incoming and outgoing data types as tailored by the modules attached to the base unit and programmed to control the data line switch depending on data transmission programming obtained from the processing modules thereby allowing the base unit to function as a source of electronic data management and electronic data processing for all incoming and outgoing data types transmitted through the modem, creating a self-contained, stand-alone device that protects access to the computer system.

2. The computer system device of claim 1 wherein the multi functional computer system device functions is a secondary source of electronic data management and electronic data processing for all incoming and outgoing data types.

3. The computer system device of claim 1 wherein the multi functional computer system device is installed in series between a target PC and external networks such that all incoming and outgoing data types are monitored and processed by the computer system device before being release to said protected target PC and said external networks respectively.

4. The computer system device of claim 1 wherein the multi functional computer system device houses all of the processing and software means for data and equipment protection from data network transmission of malicious codes, programs and the physical and software means to disintegrate, isolate and separate share resources from non Internet based computer functions and Internet based functions.

5. The computer system device of claim 1 wherein said means for electronic data communication and said means for providing electrical power comprise two power and two data connectors on each processing module such that multiple processing modules may mated to each other in series.

6. The computer system device of claim 1 wherein the data processor in said base is programmed to control electrical power and manage communication network connectivity between all modules and outside network devices, and said processing modules are geometrically distinguishable from one another while plugged into the base module, thereby allowing a user to identify the task of specific modules by geometric appearance.

* * * * *